US005475653A

United States Patent [19]

Yamada et al.

[11] Patent Number: 5,475,653

[45] Date of Patent: Dec. 12, 1995

[54] ANALOG WRISTWATCH PAGING RECEIVER

[75] Inventors: Takehide Yamada, Beaverton; Dimitri Dimitriadis, Lake Oswego; Garold B. Gaskill, Tualatin, all of Oreg.

[73] Assignee: Seiko Communications Holding N.V., Netherlands Antilles

[21] Appl. No.: 298,516

[22] Filed: Aug. 30, 1994

Related U.S. Application Data

[63] Continuation of Ser. No. 169,032, Dec. 17, 1993.

[51] Int. Cl.[6] .......................... G04B 47/00; G04B 19/04; H04B 7/00

[52] U.S. Cl. .......................... 368/10; 368/80; 340/825.44

[58] Field of Search .......................... 368/10, 11, 12, 368/41–44, 47, 76, 80; 340/825.44–825.49

[56] References Cited

U.S. PATENT DOCUMENTS 5,297,118 3/1994 Sakumoto .......................... 368/10

5,329,501 7/1994 Meister et al. .......................... 368/10

*Primary Examiner*—Vit W. Miska

*Attorney, Agent, or Firm*—Elmer Galbi

[57] ABSTRACT

A paging receiver as part of an analog wristwatch. A received paging message is displayed using an analog watch mechanism which includes hands that are independently controllable. Around the perimeter of the watch face or on the watch bezel are marks representing paging messages, such as "Call Home", "Call Office" etc. Paging messages are displayed by using one of the hands which normally is used to indicate time to point to one of the marks or messages on the perimeter of the watch. Optional features include using the watch hands not used to point to a mark representing a received paging message to point to a predetermined location to alert the user that a message has been received and using an LED can be used to indicate that a message has been received or that a message is pending. Other analog mechanisms, such as disks, drums, and sliding bars visible through respective apertures in the watch face can be used to display information concerning paging messages. These other analog mechanisms can be moved such that a selected mark is visible through the respective aperture in response to receiving a paging message.

2 Claims, 9 Drawing Sheets

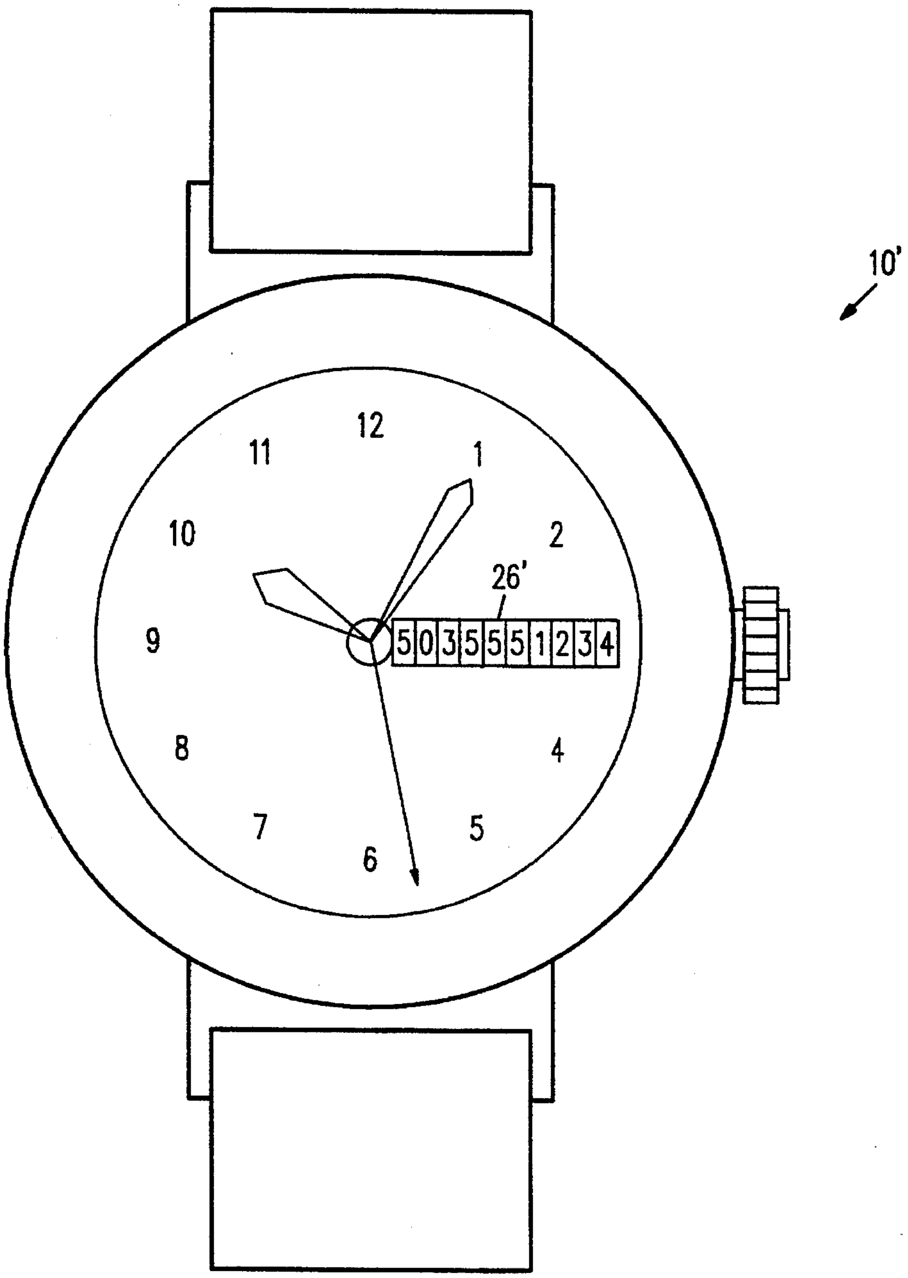
FIG. 10
FIG. 11
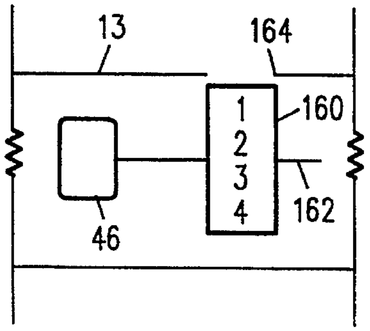

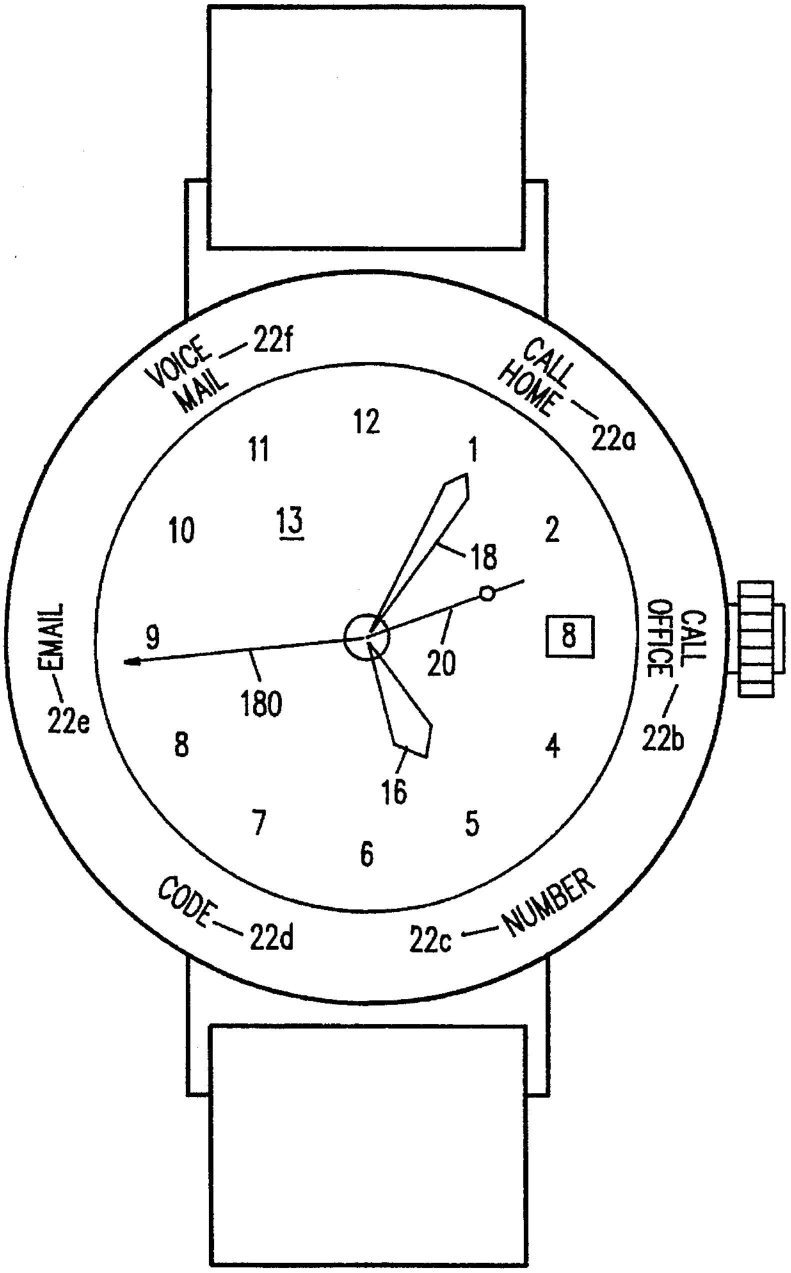
FIG. 13
FIG. 14
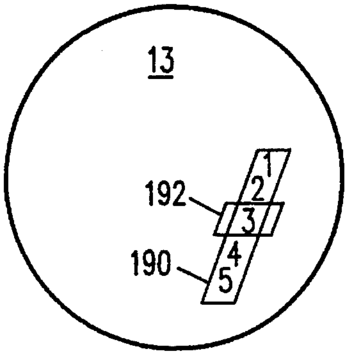

ANALOG WRISTWATCH PAGING RECEIVER

The present application is a continuation of application Ser. No. 08/169,032 filed Dec. 17, 1993.

FIELD OF THE INVENTION

The present invention relates to the field of paging receivers. More specifically, the invention relates to a paging receiver that utilizes an analog wristwatch mechanism to display paging messages.

BACKGROUND OF THE INVENTION

A paging receiver or "pager" is typically contained in a small box which is clipped to its user's belt or waistband. When the pager receives a paging message or "page" it provides an audible signal or vibrates to alert the user to the new message. The user can then look at the message displayed on a digital display.

Other pagers are contained in wristwatches having liquid crystal displays. See Gaskill et al., U.S. Pat. No. 4,713,808 for an example of a paging receiver contained in a watch. See also Pace, U.S. Pat. No. 4,845,485. Some prior art wrist watch pagers include both an analog watch mechanism and a liquid crystal paging display.

The present invention provides a new and improved method and apparatus for displaying received paging messages using an analog watch mechanism.

SUMMARY OF THE INVENTION

The present invention provides a paging receiver that includes a conventional analog watch with a plurality of hands which indicated the time of day. Around the perimeter of the watch face or on the watch bezel are marks representing paging messages, such as "Call Home", "Call Office", etc Paging messages are displayed by using one of the hands which normally is used to indicate time. In order to display a paging message one of the hands which is normally used to indicate time of day is instead used to point to one of the marks or messages on the perimeter of the watch. Optional features include using the watch hands not used to point to a mark representing a paging message to point to a predetermined location to alert the user that a paging message has been received. Alternatively an LED can be used to indicate that a message has been received. Still further alternatives include using other analog mechanisms such as disks or drums to display additional information such as code numbers or the number of pending messages.

BRIEF DESCRIPTION OF THE DRAWINGS

FIG. 10 shows a plan view of another exemplary analog wristwatch paging receiver according to the present invention having a plurality of disks that are revealed through respective apertures.

FIG. 11 shows a simplified cutaway diagram of another exemplary analog wristwatch paging receiver according to the present invention having a drum that is revealed through a aperture.

FIG. 13, shows a plan view of another exemplary analog wristwatch paging receiver according to the present invention having a dedicated hand.

FIG. 14 shows a simplified cutaway diagram of another exemplary analog wristwatch paging receiver according to the present invention having a linearly moving bar that is revealed through a aperture.

DETAILED DESCRIPTION OF THE INVENTION

Figure 1:
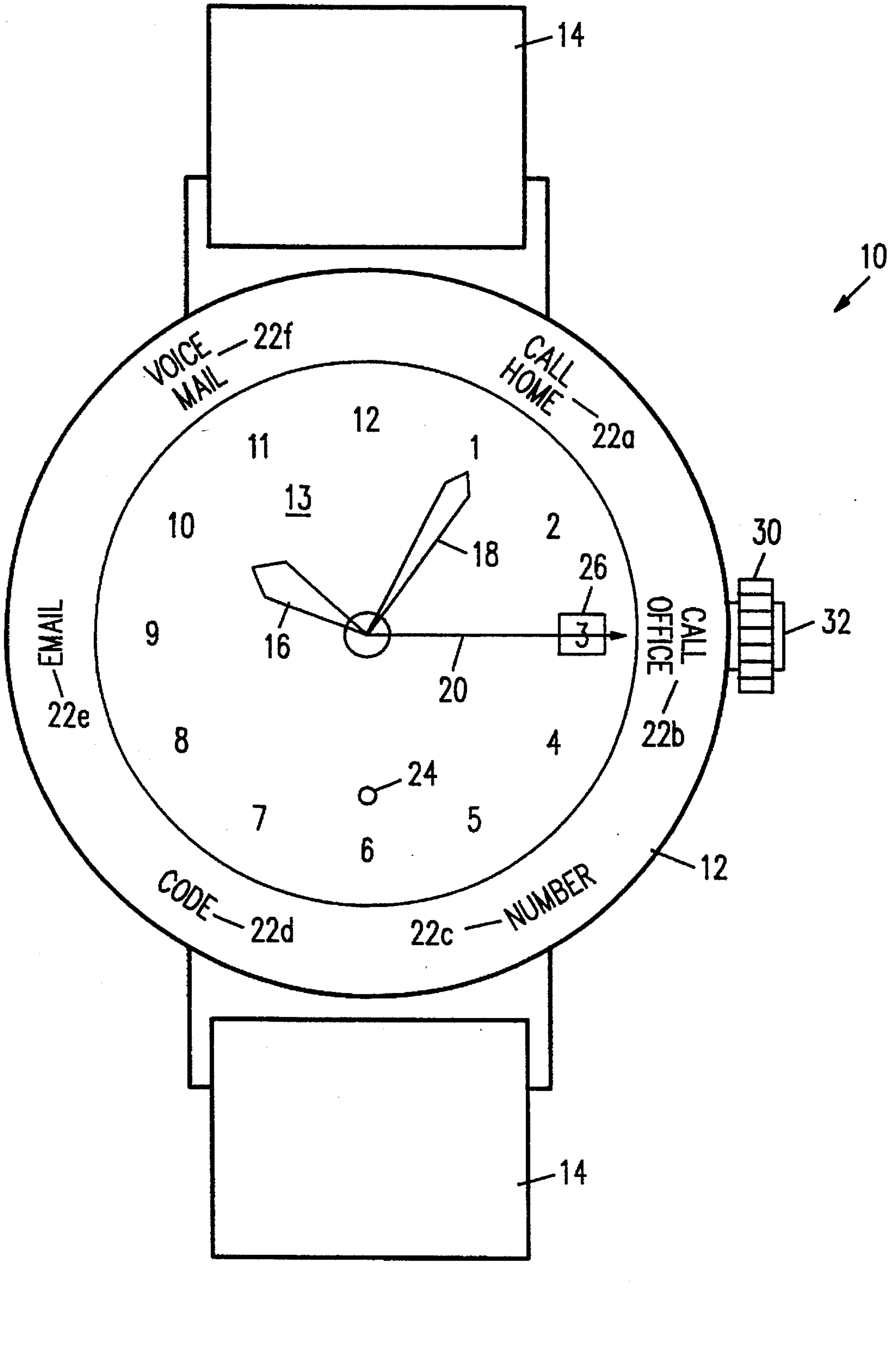
FIG. 1 shows a plan view of an exemplary analog wristwatch paging receiver according to the present invention.

Referring now to FIG. 1, the first preferred embodiment of the present invention includes a combined analog wristwatch and paging receiver ("a pager") 10 which has a wristwatch body 12 and a watch face 13. As is typical for a wristwatch, the pager 10 has straps 14 for securing the wristwatch body to a user's wrist. The pager 10 has an hour hand 16, a minute hand 18, and a second hand 20. The pager 10 rotates these three hands in a conventional manner to display the current time.

In accordance with the present invention, the pager 10 can rotate one or more of the hands 16, 18 or 20 to positions to display the content and time of receipt of paging messages.

Marks representing certain paging messages *22a–22f* are positioned around the perimeter of the watch face 13 or on the watch bezel. As shown in FIG. 1, these messages include "Call Home" *22a*, "Call Office" *22b*, "Number" *22c*, "Code" *22d*, "mail" *22e*, and "Voice Mail" *22f*.

A "Code" message simply is a number. A user can prearrange with others what significance the different code numbers will have. For example, "Code 3" could mean "call spouse at work," and "Code 4" could mean "call child at school". The "Number" mark signifies that the pager 10 received a number sequence, such as a telephone number for the user to call. Methods of displaying a number sequence are discussed below.

Although the messages are shown spelled out in the exemplary pager 10 of FIG. 1, alternatively icons representing the messages may be used.

The pager 10 displays the content of a paging message by pointing hand 20 to the corresponding mark *22a–22f*. While the second hand 20 is being used to point to paging message contents, the hour hand 16 and minute hand 18 continue to display time. As an alternative all three hands together or two of the hands together can be used to point to the paging message.

The pager 10 also includes a "message received" indicator such as a light emitting diode ("LED") 24 to indicates to the user that a paging message is ready to be displayed.

A rotating, knurled stem 30 enables the user to set the current time for the pager 10 to display. A push button 32, which is integral with the stem 30, enables the user to control what information the pager 10 displays.

As will be explained in detail later, the pager 10 may also include a disk 26 which rotates to show numbers through a aperture. The disk can be used to show the current day of the month, the number of paging messages in memory 36, or a coded message.

Figure 2:
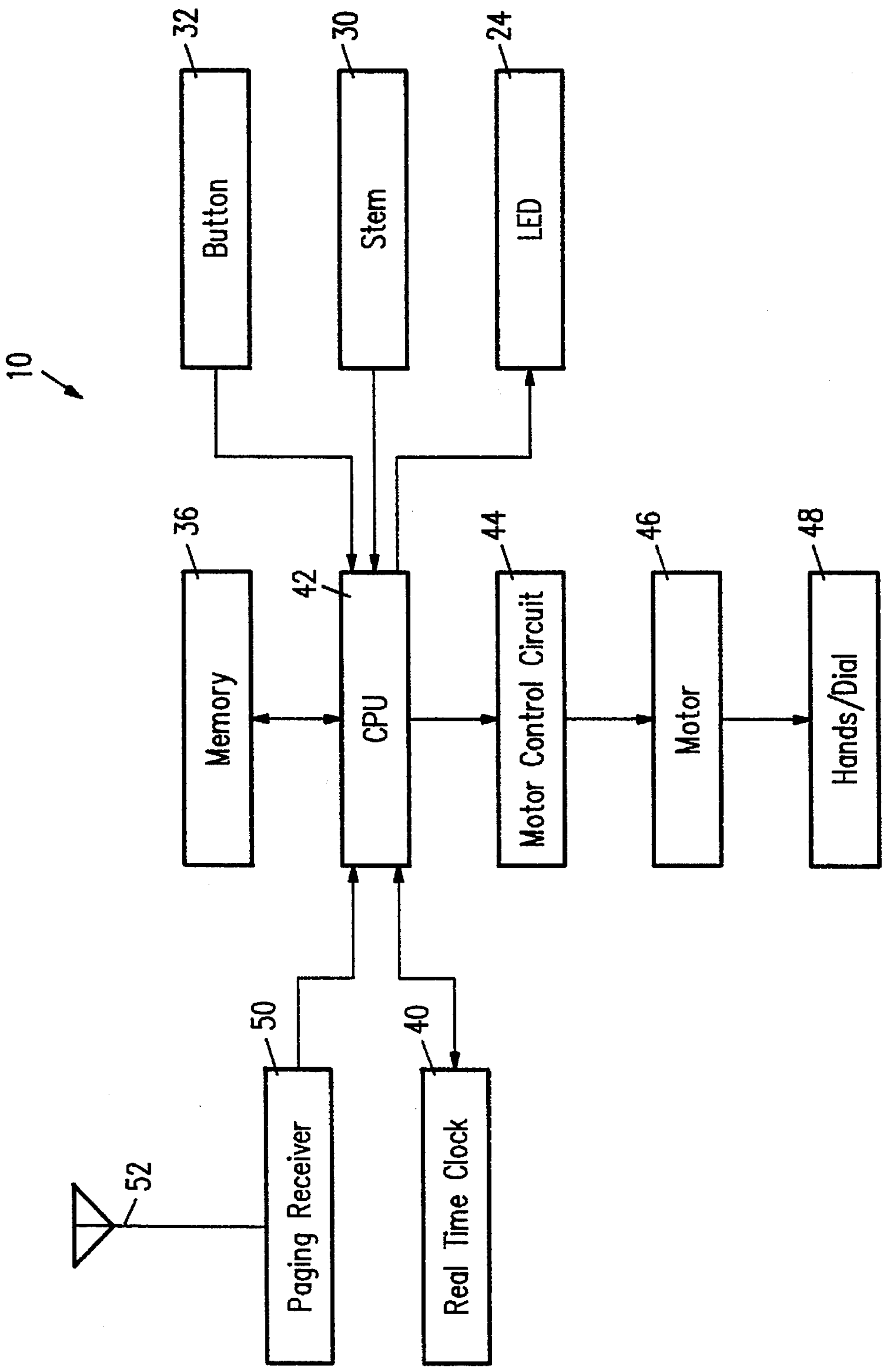
FIG. 2 shows a block diagram of the analog wristwatch paging receiver of FIG. 1.

Referring now to FIG. 2, a pager 10 according to the present invention includes a real-time clock 40, a stem 30, a central processing unit (CPU) 42 with associated program and temporary memory 36, a motor control circuit 44, a stepper motor 46, and hands 48. The stepper motor can move and position the hands independently of each other; there is no mechanical coordination between the hands. Thus, for example, the minute hand 18 may be rotated full circle around the watch face 13 without the hour hand 16 moving a corresponding one-twelfth of the way around the watch face 13.

In normal operation, the CPU 42 reads the current time from the real-time clock 40 and commands the motor control circuit 44 to move the hands 48 to display the current time. The user can set the displayed time by rotating the stem 30. The CPU 42 detects this rotation of the stem 30 and translates that rotation to a corresponding change in the time to be displayed by the hands 48 and maintained by the real-time clock 40.

A paging receiver 50 receives paging messages from a paging transmitting service (not shown) using an antenna 52 and supplies the CPU 42 with the content of the messages.

A button 32, as will be discussed in more detail below, enables the user to display messages and clear them from memory 36.

Figure 3:
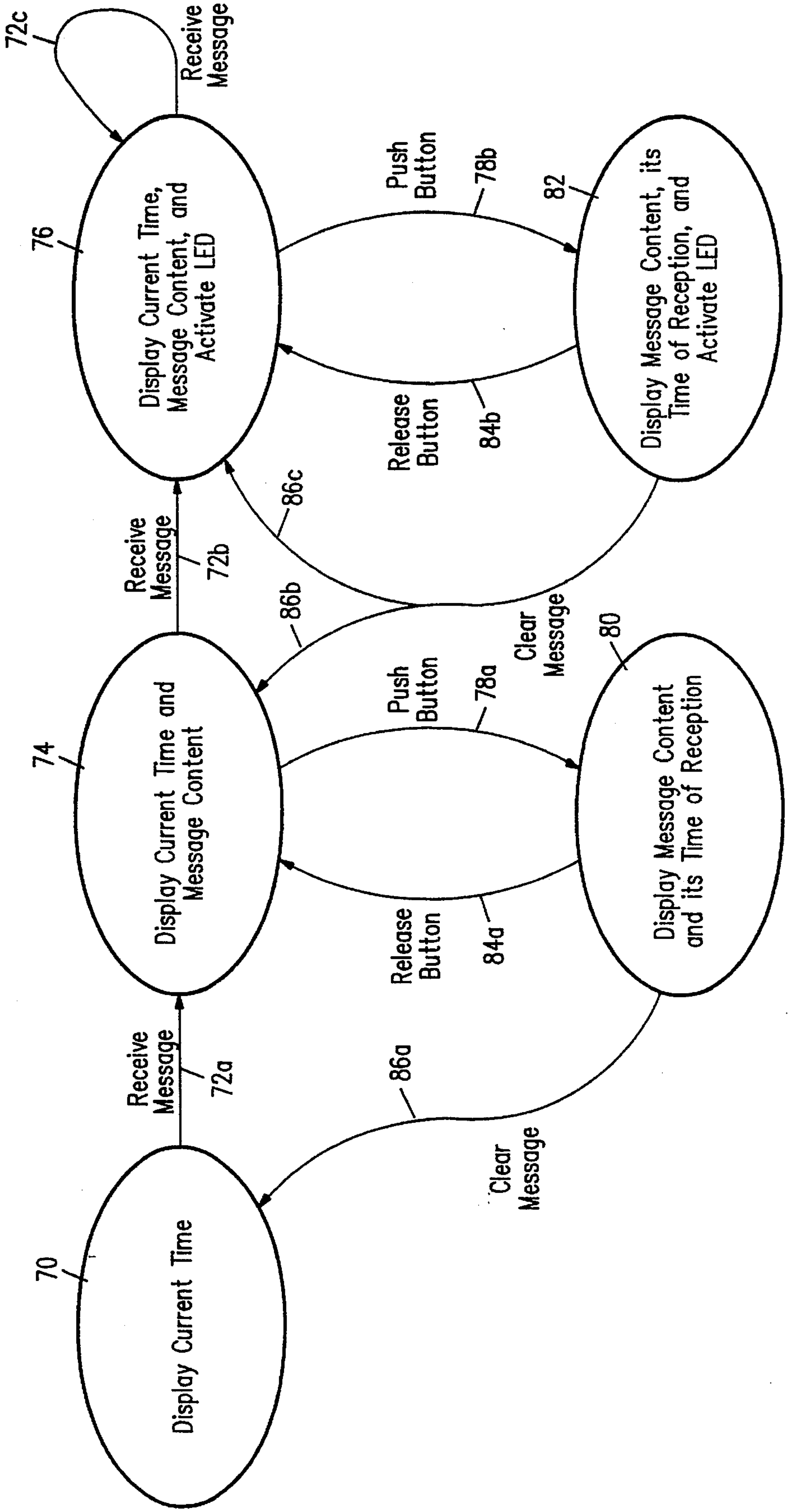
FIG. 3 shows a state diagram of an exemplary behavior of the analog wristwatch paging receiver of FIG. 1.

FIG. 3, is a state diagram which describes the behavior of pager 10 according to the present. Five states are described. The pager starts in the "Display Current Time" state 70. In this state, the pager has no messages in memory 36 and the hands 48 display the current time. When the paging receiver 50 receives a message, the CPU 42 executes the "Receive Message" transition 72*a*–72*c*.

Figure 4:
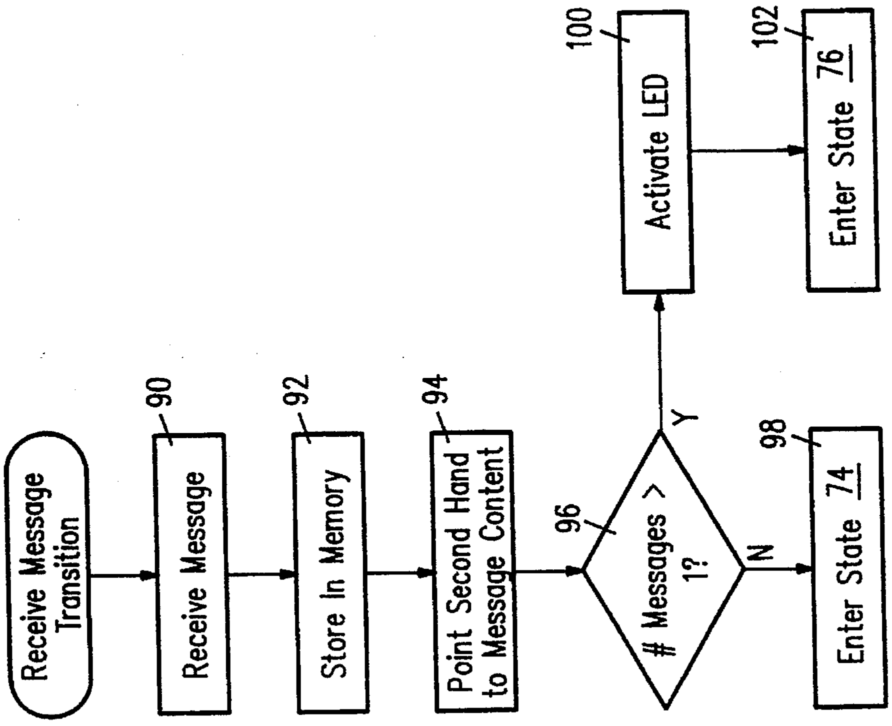
FIG. 4 shows a flow diagram of the "Receive Message" transition of FIG. 3.

Referring now to FIG. 4, which shows a flow diagram of the "Receive Message" transition 72*a*–72*c*, the paging receiver 50 receives a paging message and supplies it to the CPU 42 as step 90. The CPU 42 stores in memory 36 the content of the message and the time it was received and moves the second hand 20 to point to the mark 22*a*–22*f* corresponding to the content of the message, as steps 92 and 94. If the now displayed message is the only paging message stored in memory 36, as determined by step 96, the "Display Current Time and Message Content" state 74 (FIG. 3) is entered as step 98. This transition is shown as line 72*a* on FIG. 3. Additionally, as part of the "Receive Message" transition, the pager 10 may beep or vibrate to alert the user to the new message.

In the "Display Current Time and Message Content" state 74, the hour hand 16 and minute hand 18 display the current time, but the second hand 20 points to the content of the last received message. For example, if the last received message was "Call Office," then the second hand 20 will point to the "Call Office" mark 22*b* on the perimeter of the watch face 13, as shown in FIG. 1.

If the content of the received message is a "Code" message, the pager 10 rotates the number disk 26 to reveal the number of the coded message through the aperture. For example, the pager displays the content of a "Code 7" message by pointing the second hand 20 to the "Code" mark 22*d* and rotating the number disk 26 to show the number "7".

If the content of the received message is a "Number" sequence, the pager 10 points the second hand 20 to the "Number" mark 22*c*. A method for displaying the number sequence will be described below.

Refer again to the state diagram of FIG. 3. When the pager 10 is in the "Display Current Time and Message Content" state 74, in response to the user pressing the button 32 (FIG. 1), the pager enters the "Display Message Content and Time of Reception" state 80, as shown by line 78*a*. In this state, the second hand 20 continues to display the content of the received message by pointing to the corresponding mark 22*a*–22*d* on the perimeter of the watch face 13. The pager moves the hour hand 16 and minute hand 18 to display the time at which the pager received the message. When the user releases the button 32, the pager returns to the "Display Current Time and Message Content" state 74, as shown by line 84*a*.

If the received message is a "Number" message, the "Display Message Content and Time of Reception" state 80 operates slightly differently. On pressing the button 32, the pager 10 moves the second hand 20 to the first number of the number sequence. Then, at regular intervals, such as every three seconds, the pager moves the second hand to the next number in the sequence. This continues until all numbers in the number sequence have been displayed. The pager then returns to the "Display Current Time and Message Content" state 74.

The pager 10 can receive a second paging message when it already has stored a message in memory 36. Since only one message can be displayed at a time, the LED indicator 24 on the watch face 13 is used to indicate that the pager 10 has at least one more message to display. Referring again to FIG. 3, if the pager receives a second message while one message has already been received, it exits "Display Current Time and Message Content" state 74 and enters the "Display Current Time, Message Content, and LED" state 76 through the "Receive Message" transition 72*b*.

In the "Receive Message" transition 72*b*, the pager 10 receives, stores, displays the message as described above. However, in step 96 (FIG. 4), the pager determines that more than one message is now stored in memory 36 and activates the LED indicator 24 as step 100 and enters the "Display Current Time, Message Content, and LED" state 76, as step 102.

The "Display Current Time, Message Content, and LED" state 76 is similar to the "Display Current Time and Message Content" state 74, differing only in that the LED indicator 24 is activated. While in this state, the user can display the content and time of reception of the most recently received message by pushing the button 32, as shown by line 78*b*. As a result, the pager enters the "Display Message Content, Time of Reception, and LED" state 82.

In the "Display Message Content, Time of Reception, and LED" state 82, the pager 10 displays the content of the message with the second hand 20, and the number of the code for "Code" messages using the number disk 26, as described above. The other hands display the time at which the pager received the message. The LED indicator 24 is activated to indicate that at least one more message is stored in memory 36. When the user releases the button 32, the pager 10 returns to the "Display Current Time, Message Content, and LED" state 76.

The "Display Message Content, Time of Reception, and LED" state 82 displays number sequences for "Number" messages in the same manner as described for the "Display Message Content and Time of Reception" state 80.

If the pager 10 receives a message while it is in the "Display Current Time, Message Content, and LED" state 76, the message is received, stored, its content displayed with the second hand 20, and the same state 76 is re-entered. This is shown in FIG. 3 as transition 72*c*.

Figure 5:
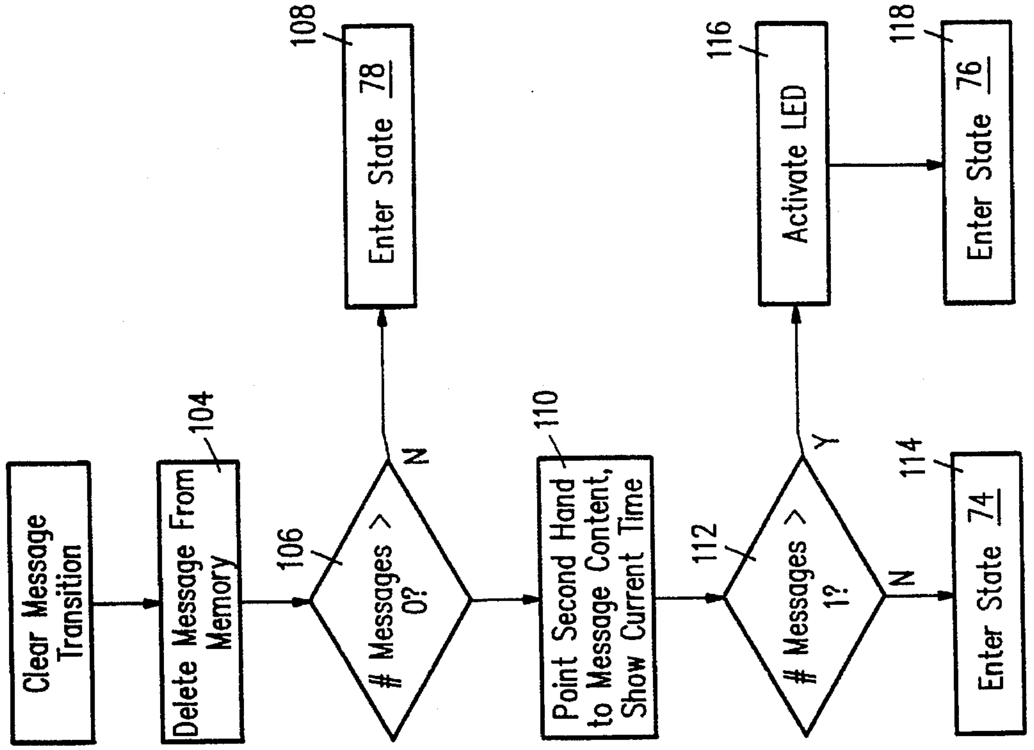
FIG. 5 shows a flow diagram of the "Clear Message" transition of FIG. 3.

The user may delete received messages from memory 36. In fact, for this first-described behavior of a pager 10, to view messages other than the most recently received message, the user must delete messages. Referring now to FIG. 5, the user presses the button 32 for a predetermined extended time period, such as ten seconds. While the button is held down, the pager 10 displays the content and reception time of the message, as described above for states 80 and 82. When the predetermined time period approached, the pager can beep to indicate that a message is about to be deleted. After the predetermined time period is reached, the message is deleted, as step 104. If no messages remain in memory 36, as determined by step 106, the pager 10 enters the "Display Current Time" state 70 as shown by line 86*a* of FIG. 3.

If another message remains in memory 36, the pager 10 points the second hand 20 to the corresponding mark 22*a*–22*d* on the perimeter of the watch face 13 and displays the current time using the hour hand 16 and minute hand 18, as step 110. If only one message remains in memory 36, as determined by step 112, the pager enters the "Display Current Time and Message Content" state 74 as shown by line 86*b* of FIG. 3. Otherwise, the pager activates the LED 24 and enters the "Display Current Time, Message Content, and LED" state 76 as shown by line 86*c* of FIG. 3.

In the above description, the LED indicator 24 is described as informing the user whether more than one message is stored in memory 36. A second number disk, similar to the number disk 26 used to display the day of the month and code messages, may be used to indicate the number of messages stored in memory 36. This disk would be rotated to increase by one the number displayed for each new message received. Likewise, the disk would be rotated to decrease by one the number displayed for each message deleted.

Figure 6:
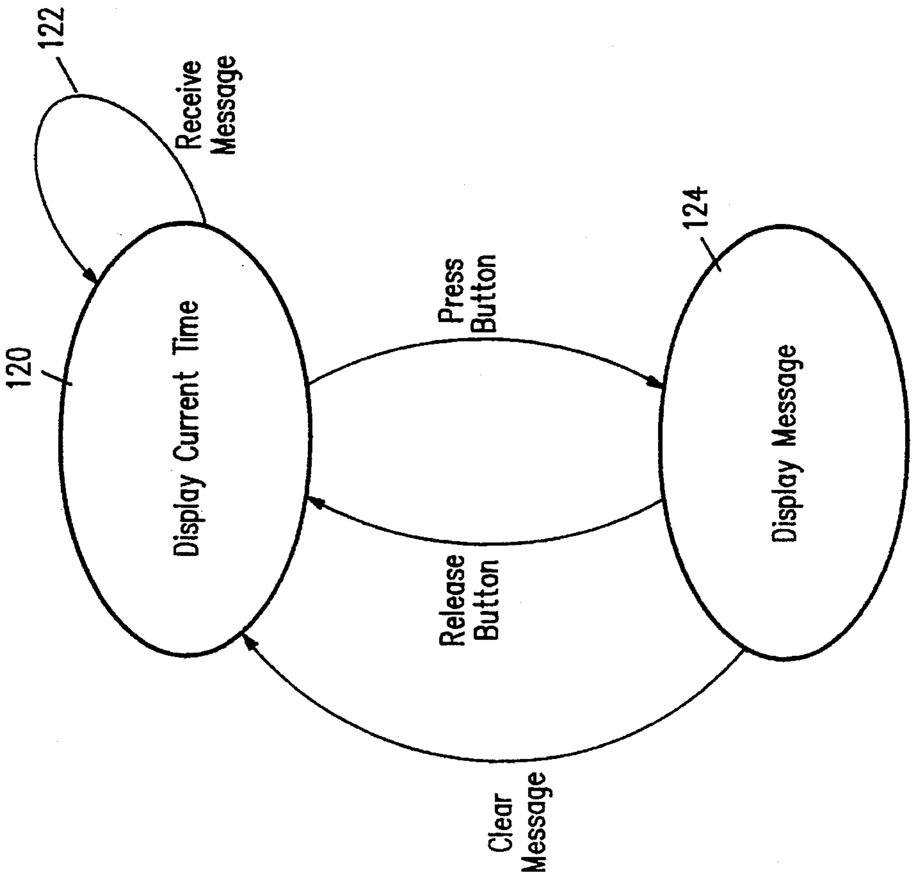
FIG. 6 shows a state diagram of another exemplary behavior of the analog wristwatch paging receiver of FIG. 1.

Referring now to FIG. 6, another exemplary behavior of a pager 10 according to the present invention is shown. In the "Display Time" state 120, the watch hands 48 display the current time. When the pager 10 receives a message, the pager executes the "Receive Message" transition 122.

Figure 7:
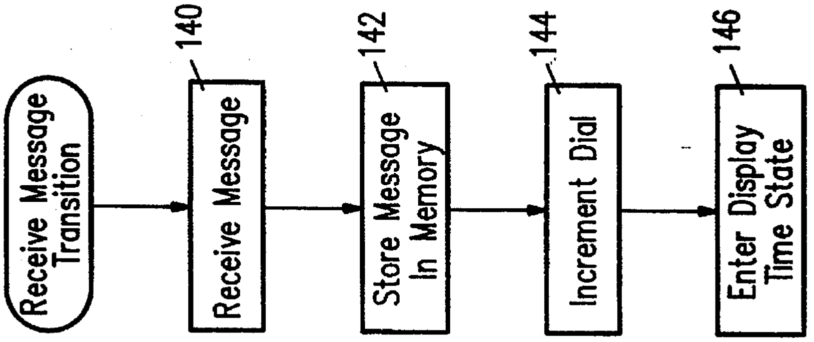
FIG. 7 shows a flow diagram of the "Receive Message" transition of FIG. 6.

Referring now to FIG. 7, which shows a block diagram of the "Receive Message" transition 122, the pager 10 receives a message as step 140. The pager stores the message as step 142 and increments the disk 28 to show the number of messages stored in memory 36 as step 144. The pager then returns to the "Display Time" state 120 as step 146.

Referring again to FIG. 6, when the user presses the button 32 the "Display Message" state 124 is entered. In this state, the second hand 20 points to the content of the message by pointing to the corresponding mark 22*a*–22*f* on the perimeter of the watch face 13. The hour hand 16 and the minute hand 18 display the time the pager received the message. When the user releases the button 32, the pager 10 returns to the "Display Time" state 120.

To display a "Code" message, the second hand 20 may periodically alternate between pointing to the "code" mark 22*d* and the number on the watch face 13 corresponding to the code number.

Alternatively, the pager 10 can activate the LED 24 to indicate that the second hand is pointing to a code number when a code message is being displayed. For this alternative, the "Code" mark 22*e* may not be needed, or the LED 24 would preferably be positioned adjacent to the "Code" mark.

As another alternative, the pager 10 can rotate the number disk 26 to show the code number when in the "Display Message" state 124.

If the message is a "Number" message, the "Display Message" state 124 operates as described for the "Display Message Content and Time of Reception" state 80 (FIG. 3) above. On pressing the button 32, the pager 10 moves the second hand 20 to the first number of the number sequence. Then, at regular intervals, such as every three seconds, the pager moves the second hand to the next number in the sequence. This process continues until all numbers in the number sequence have been displayed. The pager then returns to the "Display Current Time" state 120.

The most recently received message can be deleted as described above by depressing the button 32 for a predetermined extended time period. When a message is deleted, the number disk 26 is rotated to decrease by one the number showing through the aperture. The pager 10 then enters the "Display Current Time" state 120.

Figure 8:
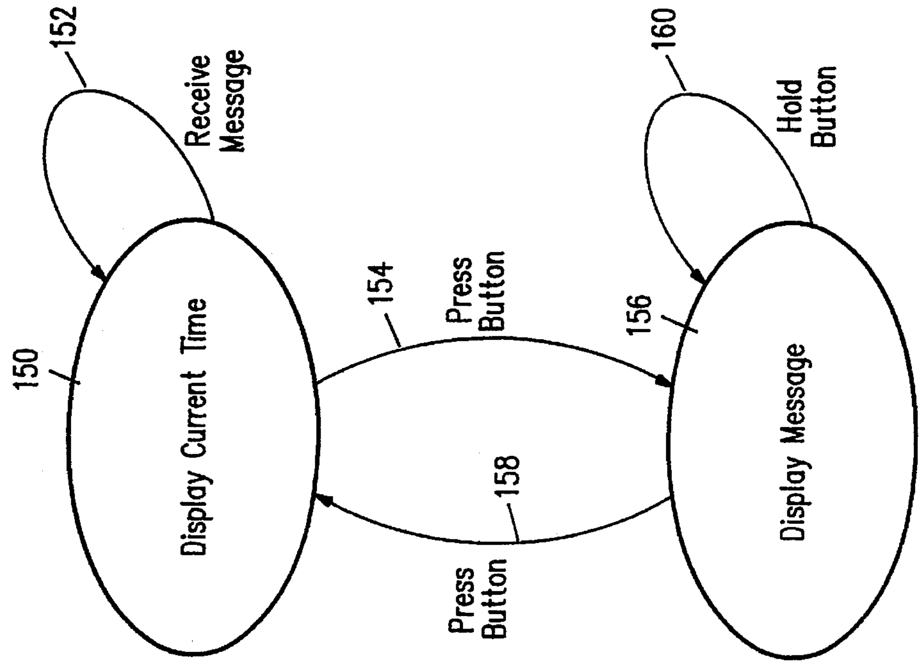
FIG. 8 shows a state diagram of another exemplary behavior of the analog wristwatch paging receiver of FIG. 1.

An alternative state diagram is shown in FIG. 8. As shown in FIG. 8, in a "Display Time" state 150, the hands 40 of the pager 10 display the current time.

When the pager 10 receives a message, the pager executes the "Receive Message" transition 152. This transition preferably occurs as described in reference to FIG. 7.

When the user presses the button 32, the "Display Message" state 156 is entered. In this state, the second hand 20 points to the content of the message by pointing to the corresponding marked message 22*a*–22*d* around the perimeter of the watch face 13. The method for displaying "Code" and "Number" messages is as described above. However, "Code" messages must be displayed without using the number disk 26, as this is used to display the message number. When the user presses the button 32 again, the pager 10 returns to the "Display Time" state 150.

According to the behavior described in the state diagram of FIG. 8, the user may display other messages in memory 36 without first deleting all of the more recently received messages. While in the "Display Message" state 156, the user depresses the button 32 for a predetermined time period, such as two seconds. In response, the pager 10 displays the content and time of reception of the previous message. The second disk 28 is decremented to show the number of the message being displayed.

When the user presses the button 32 for less than the predetermined time period, the pager 10 returns to the "Display Time" state 150. If multiple messages were reviewed in the display message state 156, the second disk 28 is reset to show the total number of messages stored in memory 36.

A second button (not shown) may be used in the display message state 156 to delete the currently displayed message. Such a capability is not necessary, however, as long as older messages are automatically deleted by the pager 10. For example, the oldest message could be deleted to make room for a newly received message once a certain limit of messages has been received. Alternatively, a message could be deleted after it had been stored for a predetermined number of days.

Figure 9:
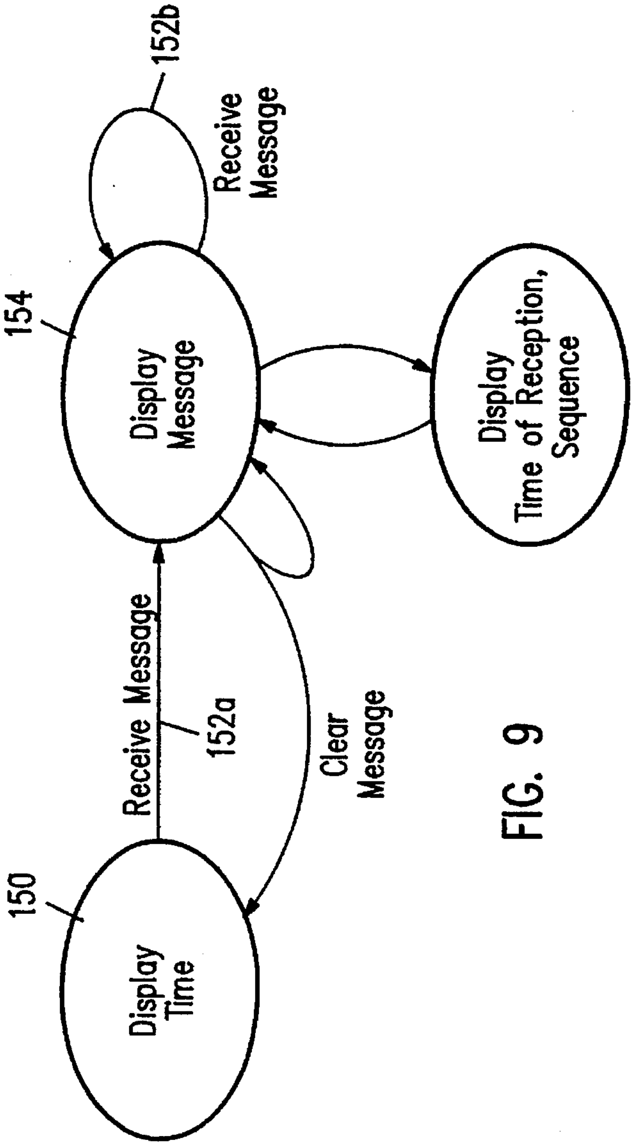
FIG. 9 shows a state diagram of another exemplary behavior of the analog wristwatch paging receiver of FIG. 1.

FIG. 9 which shows another alternative for a pager 10 according to the present invention. In a "Display Time" state 150, the pager 10 displays the current time using the hands 40.

When the pager 10 receives a message, the pager enters the "Display Message" state 154 via the "Receive Message" transition 152*a*. The "Receive Message" transition is nearly the same as shown in FIG. 4. That is, the pager receives the message, stores it in memory 36, and moves the second hand 20 to the corresponding mark 22*a*–22*f* on the perimeter of the watch face 13. However, rather than continuing to display the current time with the hour hand 16 and minute hand 18, the pager moves those hands up to the hour "12" numeral at the top of the watch face 13. Note that to avoid confusion, none of the standard message marks 22*a*–22*f* are located directly above the hour "12" numeral, as shown in FIG. 1.

Although the hour hand 16 and minute hand 18 may be pointed to other locations, or may continue to show the current time, moving them to the hour "12" numeral places them in a position where the user will notice at a glance that a message has been received.

In the case of a "Code" message, the pager 10 moves the second hand 20 to point to the corresponding mark 22*e* and moves the disk 26 to reveal the appropriate number. For example, if a "Code 7" message is received, the pager 10 moves the hour hand 16 and the minute hand 18 to point to the hour "12" numeral on the watch face 13. The pager also moves the second hand 20 to point to the "Code" mark 22*e* and rotates the disk 26 to reveal the number 37 7" through the aperture.

Alternatively to using the disk 26 to display a "Code" message, the pager can move the minute hand 18 to point to the appropriate hour numeral on the watch face 13. Using the same example message of "Code 7", the pager 10 moves the hour hand 16 to point to the hour 12 numeral, moves the minute hand 18 to point to the hour "7" numeral, and moves the second hand 20 to point to the "Code" mark 22*e*.

In the case of a "Number" message, the pager 10 moves the hour hand 16 and minute hand 18 to point to the hour "12" numeral on the watch face 13 and moves the second hand 20 to point to the "Number" mark 22*c*. The numbers in the sequence are displayed as described below.

Preferably, as part of the "Receive Message" transition 152*a*–152*b*, the pager 10 also beeps to alert the user to the newly received message.

Optionally, the LED 24 may signify that other messages are pending to be displayed.

In the "Display Message" state 154, the pager 10 continues to point the hands 16, 18, 20 to the locations they were moved to during the "Receive Message" transition 152*a*. When the user notices that a message has been received, the user may see the time of reception by pressing the button 32. In response, the pager 10 moves the hour hand 16 and minute hand 18 to display the time the pager received the message. When the user release the button, the pager returns to the "Display Message" state 154.

If the message is a "Number" message, the pager 10 moves the second hand 20 to the first number of the number sequence. Then, at regular intervals, such as every three seconds, the pager moves the second hand to the next number in the sequence. This continues until all numbers in the number sequence have been displayed. If the user does not wish to wait three seconds to see the next number in the sequence, pressing the button causes the pager to display the next number in the sequence.

After all numbers in the sequence have been displayed, the pager then returns to the "Display Message" state 154.

Subsequent messages can be received when the pager is in the "Display Message" state 154 as shown by line 152*b*. The new message is received, stored, and displayed as described above in reference to the "Receive Message" transition 152*a*. The "Display Message" state is reentered with the newly received message being displayed.

The most recently received message can be deleted as described above by depressing the button 32 for a predetermined extended time period. If no messages remain in memory 36, the pager 10 enters the "Display Time" state 150. Otherwise, the next message is displayed and the pager 10 enters the "Display Message" state 154.

The present invention has been described in terms of using the hands normally present on a watch such as the hour hand 16, minute hand 18, the second hand 20, and the number disk 26. This need not be the case. Extra disks behind apertures, hands, drums, slide bars and other devices may be used to display paging messages while retaining the analog watch appearance.

Additionally, by devoting other hands and such to displaying paging message information, more information may be displayed at one time.

For example by having another rotating disk 26, a pager 10 could display both a "Code" message and the message count. With a third rotating disk, the pager could also display the date a message was received.

FIG. 10 shows another alternative embodiment. As shown in FIG. 10, a pager 10' according to the present invention includes the elements described in reference to the pager of FIG. 1. However, rather than a single number disk 26 as shown in FIG. 1, the pager of FIG. 10 includes a plurality of independently rotatable disks 26' revealed through a aperture.

These disks 26' can be moved to show an entire number sequence at once. For example, by using ten disks, as shown in FIG. 10, a phone number including the area code may be displayed.

Furthermore, since the numbers of zero through nine will not use the available space on the disk, selected letters and blank spaces may be included on the disks such that the standard messages of "Home," "Office," "Email," and "Vmail" can be displayed. Coded messages also may be displayed by showing "Code" and the code number.

These disks 26' may also be used to display time information, such as the month and day, or the time of another time zone in digital form.

Referring now to FIG. 11, a drum 160 may be used instead of a rotating disk. The axis of the drum is parallel to the watch face 13. An aperture 164 in the watch face enables the upper portion of the drum to be viewed by the user. A motor 46 controlled by the CPU 42 moves the drum such that a selected portion of the drum is visible through the aperture.

The drum 160 may be used in the same manner as described above for disks 26, 26'. Furthermore, a plurality of drums may be used to display different information simultaneously.

Figure 12:
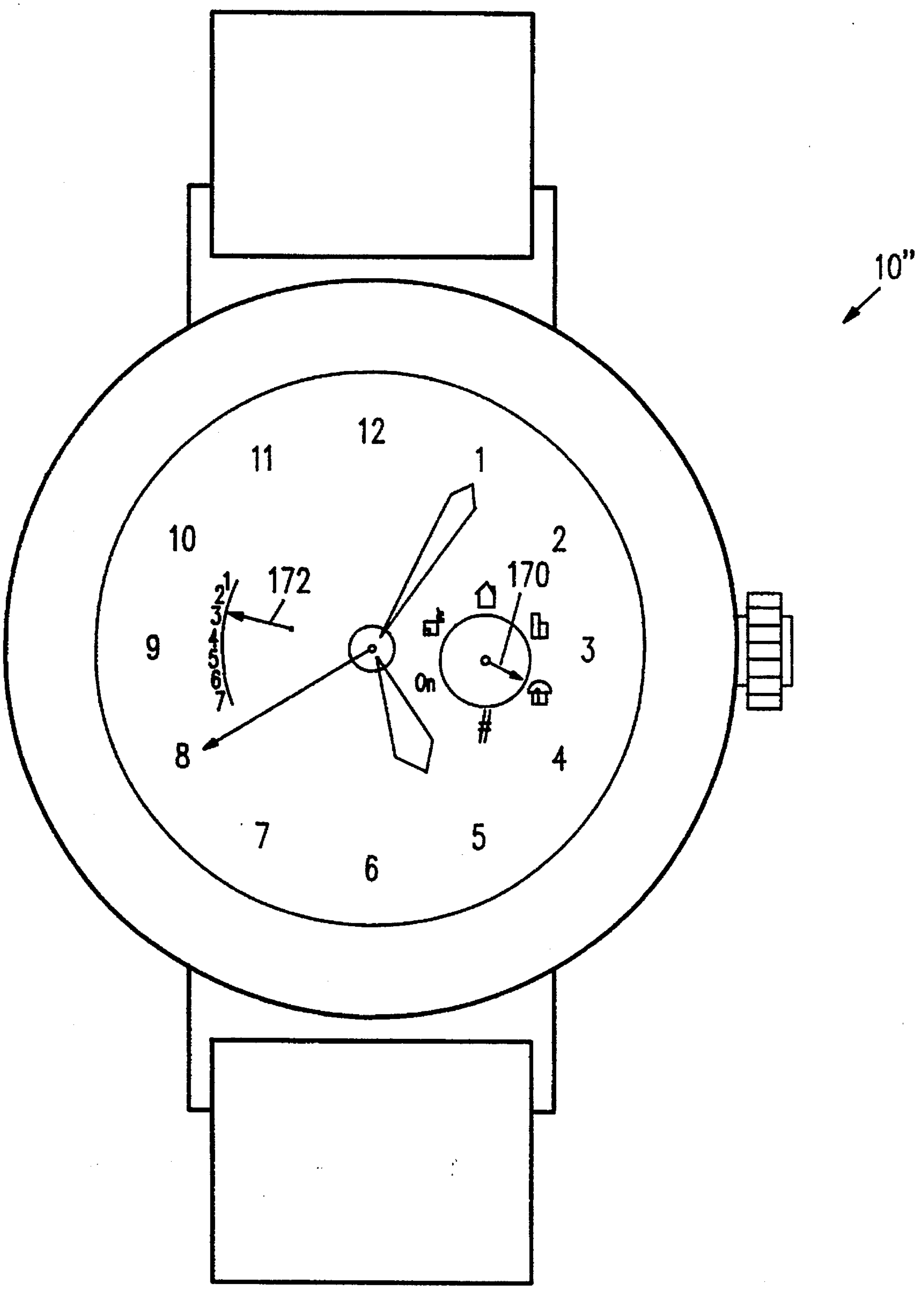
FIG. 12 shows a plan view of another exemplary analog wristwatch paging receiver according to the present invention having pointers that move through arcs.

Referring now to FIG. 12, additional dedicated pointers may be used to display paging messages. The first pointer 170 is surrounded by exemplary icons representing the standard paging messages discussed above, namely: "Call Home," "Call Office," "Voicemail," "Number," "Code," and "Email." The pager 10" displays the content of a received message by rotating the pointer 170 to the appropriate icon.

A second pointer 172 is used to display the number of paging messages held in memory 36. As shown by this pointer, pointers need not rotate in a full circle.

Additional dedicated pointers need not have a separate rotational axis from the hour hand 16, minute hand 18, and second hand 20. As shown in FIG. 13, a dedicated hand 180 is used to point to the standard paging message marks 22*a*–22*f* around the perimeter of the watch face 13. When no message is to be displayed, the dedicated hand 180 can point to an arbitrary location where there is no message mark, such as at the hour "12" numeral.

Referring now to FIG. 14, as another alternative, a slide bar 190 having numbers imprinted thereon may be used to display paging information. The slide bar is movable along its lengthwise dimension, enabling a selecting imprinted number to be viewed through an aperture 192 in the watch face 13.

A slide bar 190 may be used in the same manner as hands, disks, and drums in displaying paging information.

The terms and expressions that have been employed in the foregoing specification are used therein as terms of description and not of limitation, and there is no intention, in the use of such terms and expressions, of excluding equivalents of the features shown and described or portions thereof, it being recognized the scope of the invention is defined and limited only by the claims that follow.

What is claimed is:

1. A device for displaying a paging message that includes an analog watch mechanism, said analog watch mechanism including a plurality of hands and a disk with a plurality of marks thereon, said device including:

(a) message receiving means for receiving a paging message;

(b) means for moving one of said hands to indicate that a message has been received, and (c) means for moving said disk such that a mark on said disk indicates the message received.

2. The device recited in claim 1, wherein the analog watch mechanism includes a watch face having an aperture therethrough and said disk is located behind the watch face.

* * * * *